Patented Feb. 4, 1930

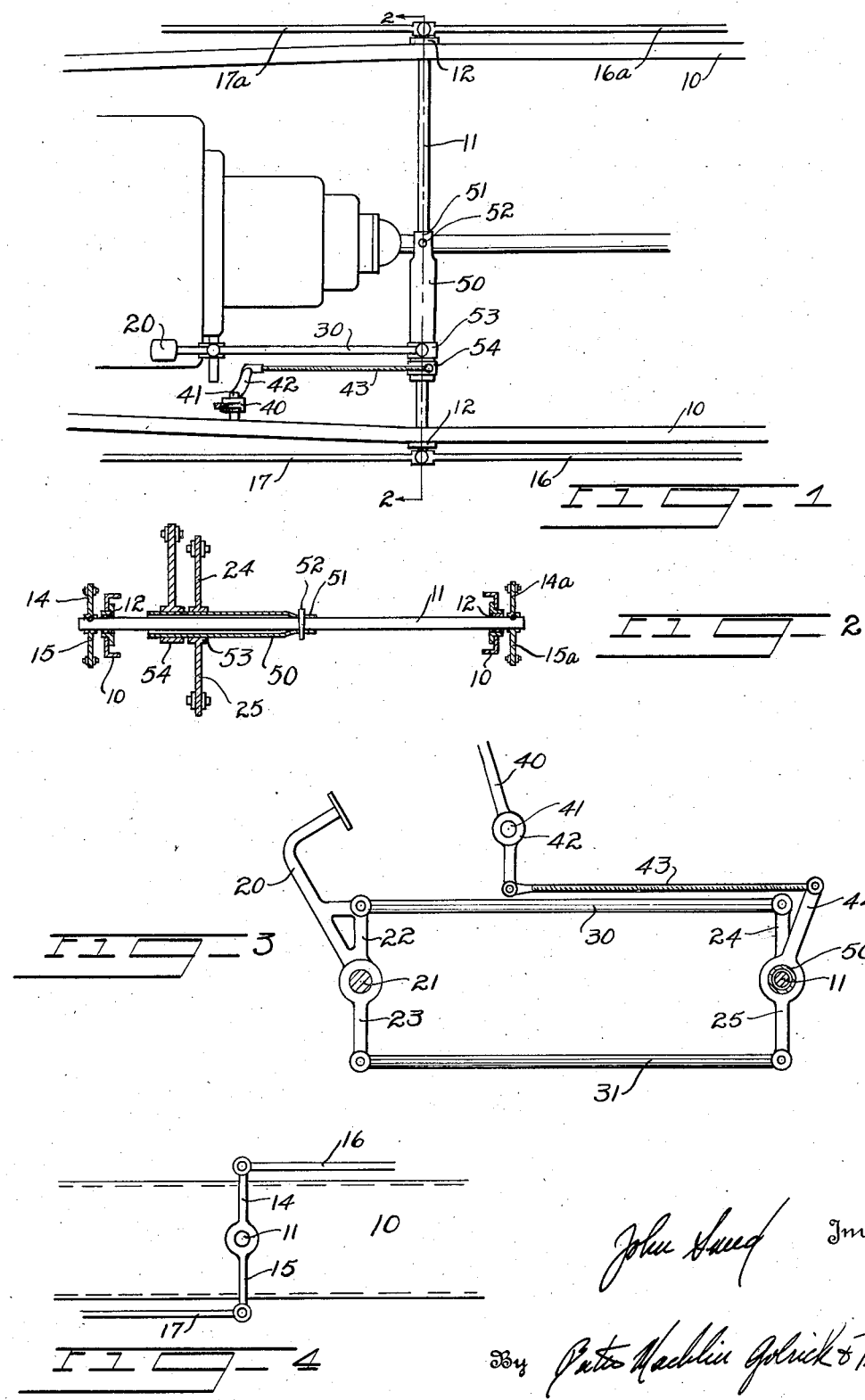

1,746,058

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

BRAKE LINKAGE

Application filed November 4, 1927. Serial No. 230,971.

This invention relates to brakes for motor vehicles and more particularly to the linkage or hook-up in the brake operating mechanism. The subject matter of this invention constitutes a modification and an improvement over the matter shown in my copending application, Serial No. 218,874, filed September 12th, 1927.

In transmitting braking effort from the manually operated pedal or lever to the brakes on the right and left side of an automobile, it has been found advantageous to use at least one transverse cross shaft. The brake pedal and hand lever are usually, in fact always, disposed away from the median line of the vehicle, and the connections from the pedal or lever join the shaft at points spaced from its mid portion. For instance, such a shaft connection may be 8 inches from one end of the shaft and as much as 24 inches from the other end. It follows, if the shaft gives or twists within itself under torsional strain, as of course it must, that for a given torque imposed upon the shaft and with equal loads on the ends of the shaft, a greater turning movement will result at the end nearer the point of application of torque than at the end more remote from such point. Inasmuch as the torsional displacement is in proportion to the torque imposed on the shaft, I have found it practically impossible to accurately compensate by brake adjustment for all conditions of operation. It might be possible to reduce the torsional displacement to a workable minimum by making the cross shaft of unusual strength, but I desire to make the parts as light as possible, both to save cost and to reduce the weight of the mechanism.

It is among the objects of my invention therefore, to connect the brake operating levers to the cross shaft in such a manner that torque will be applied at the center of the shaft so that the torsional displacement between the point of application and each end of the shaft is equal. In other words, my object is to cause the brake rods on the right side of the car and on the left side of the car to be moved through equal distances with equal forces. A further object is to arrange the connections between the manually operated pedal and the cross shaft so that unbalanced couples will be delivered to the shaft instead of direct off-set forces, so that the shaft will be relieved of lateral strain. Another object is to arrange the connections between the manually operated levers and the individual brake actuating rods so that equal movement will be imparted to each rod.

Other objects will appear from the following description of the apparatus embodying my invention, reference being had to the accompanying drawing in which a preferred form is illustrated. The essential characteristics are summarized in the claims.

In the drawings, Fig. 1 is a plan view of a portion of a motor vehicle including the brake operating hook-up; Fig. 2 is a section taken along the line 2—2 of Fig. 1 through the transverse brake shaft or cross shaft; Fig. 3 is an elevation of the arrangement of the brake operating levers with respect to the cross shaft; and Fig. 4 is an end elevation of the shaft showing the vehicle frame and connections to the brake rods.

Referring to Fig. 1, I show the vehicle frame 10, through the side members of which extends the cross shaft 11 mounted in suitable bearings as at 12. Referring also to Fig. 4, a pair of oppositely extending arms 14 and 15 are secured to the shaft 11 and in turn are pivotally connected to brake actuating rods 16 and 17, these rods extending respectively rearwardly and forwardly to actuate the brakes (not shown) on the left side of the vehicle. Similar arms 14ª and 15ª along with rods 16ª and 17ª (see Fig. 1) extend respectively rearwardly and forwardly and connect the brakes (not shown) on the right side of the vehicle. Referring to Figs. 1 and 3, I show the brake pedal 20 pivotally mounted on the shaft 21 and having oppositely extending arms 22 and 23 in fixed relation with the pedal. Connecting links 30 and 31 join the ends of the arms 22 and 23 to arms 24 and 25 which extend oppositely from the axis of the cross shaft 11. A lever 40 having an extension 42, is shown pivotally mounted on a shaft 41 and is connected at one end to a cable 43. The cable 43 is also secured to the arm 44 as shown.

Referring more particularly to Fig. 2, I show the shaft 11 extending through the side members of the frame 10 and journalled in the bearings 12. The brake rod connections 14 and 15, and 14a and 15a are on opposite ends of the shaft. Overlying the shaft 11, I place a sleeve 50 which may closely fit the shaft and be secured thereto at the center of the shaft at equal distances from the ends thereof as at 51. The sleeve 50 may be secured to the shaft by any suitable means such as a taper pin 52. It will be seen that the sleeve 50 is reduced in diameter adjacent the point 51 and that the sleeve clears the shaft at all points except at or near the point 51. Thus torque imparted to the sleeve is transmitted to the shaft through the pin 52 to the middle of the shaft at the point 51.

The pedal connection is made through the oppositely extending arms 24 and 25 (see Figs. 2 and 3) which are rigidly secured to the sleeve 50 as at 53. The lever actuated arm 44 is rigidly secured to the sleeve 50 as at 54. It will be seen therefore, that the torque delivered to the shaft 11 is delivered at a point equidistant from its ends and in the median plane of the vehicle so that torsional displacement between that point and the right and left ends of the shaft will be the same when the strains in the several brake rods are equal. It will further appear that effort from the pedal 20 is delivered to the sleeve 50 in the form of an unbalanced couple (see my copending application mentioned above) so that no lateral strain is placed on the sleeve 50 nor on the shaft 11. In this manner there is no tendency for relative movement between the axis of the sleeve and the axis of the shaft. In other words, the clearance between the end of the sleeve and the body of the shaft will remain substantially constant while the shaft is being rotated. The arm 44 to which the emergency lever 40 is connected is preferably placed immediately adjacent the arms 24 and 25 as at 54 and 53 as shown in Fig. 2. When the emergency lever 40 is used, the cable 43 is drawn to rotate the sleeve 50 and a lateral strain is put upon the sleeve. However, this strain is taken through the links 30 and 31 and is transmitted to the shaft 21 so that no relative movement between the sleeve and shaft results.

If connections other than that disclosed in my copending application, as well as this application, were to be used between the pedal, lever and the sleeve, it would be advisable to use spacing members between the ends of the shaft and the sleeve. It would also be advisable to provide bearings for the mid portion of the sleeve and shaft to prevent lateral distortion. I wish to point this out as being within the spirit and scope of that phase of my invention, which relates to delivering torque to the middle of the cross shaft. Structural changes may appear to one skilled in the art without departing from the scope of the invention, and while I have shown a preferred form of my invention, I do not care to be limited in the scope thereof other than by the claims appended hereto.

I claim:

1. The combination of a brake actuating cross shaft, a sleeve rigidly secured to the middle of said cross shaft and being out of contact with the shaft for the greater part of its length, and means for delivering torque to said sleeve to rotate said shaft.

2. In a vehicle having brakes on the right and left sides thereof, the combination of a rotatable cross shaft, connections between the ends of said shaft and said brakes, brake applying means laterally offset from the median plane of said vehicle, and means actuated by said brake applying means comprising a sleeve engaging said cross shaft in the median plane of said vehicle and extending coaxially of said shaft and spaced therefrom.

3. In a vehicle having right and left brakes, a rotatable cross shaft, connections between said shaft and said right and left brakes respectively, a member engaging said shaft at a point equidistant from said connections, and means for delivering an unbalanced couple to said member in a plane displaced from the point of engagement between said member and said shaft, whereby said shaft is relieved of bending load and whereby torque is delivered to its mid-portion without imposing a lateral load thereon.

4. In a vehicle having a frame, the combination of right and left brakes, right and left brake pull rods, a rotatable cross shaft journalled at its ends in said frame and connected to said pull rods, a sleeve engaging said shaft in the median plane of the vehicle and being rotatable therewith and spaced therefrom, and means for delivering an unbalanced couple to said member between the said median plane of the vehicle and one end of said shaft.

5. The combination of a rotatable brake actuating member, a second member secured to said first member at a point equidistant from its ends, said second member lying coaxially of said first member but out of contact therewith except at the point of engagement, and means for rotating said second member and maintaining said members in coaxial alignment.

6. The combination of a brake cross shaft journalled at its ends, a sleeve secured to said cross shaft at a point equidistant from said ends, said sleeve extending coaxially of said shaft but out of contact therewith for at least part of its length, and means for rotating said sleeve and maintaining said sleeve and said shaft in coaxial alignment.

7. In a vehicle having a brake actuating cross shaft, connections between the ends of said shaft and the right and left vehicle brakes respectively, a brake pedal offset from the median plane of the vehicle, an emergency brake lever, and means connecting said pedal and lever to said shaft to act on the shaft in the median plane of the vehicle.

8. The combination of a brake actuating cross shaft, spaced connections on said shaft for actuating the vehicle brakes, a sleeve engaging said shaft at a point equidistant from said connections, and a plurality of means engaging said sleeve for rotating it, at least one of said means being idle while the other means rotates said sleeve.

9. The combination of a brake actuating cross shaft, connections at the ends of said shaft for actuating the vehicle brakes, a sleeve engaging said shaft at a point equidistant from its ends, means engaging said sleeve including outwardly extending arms spaced away from said point of engagement, a lever connected to one of said arms, and a pedal connected to at least one other of said arms.

10. The combination of a vehicle having a frame, of right and left brakes therefor, a member extending transversely of said frame and connected respectively to the right and left brakes of the vehicle, a second member rotatable with the first named member engaging said first named member at a point equidistant from the connections to the right and left brakes of the vehicle, means for imparting an unbalanced couple to said second member at a point spaced from the point of engagement of said member and a second means for rotating said second member and engaging said second member adjacent said first named means.

11. In combination a brake cross shaft, a sleeve overlying said shaft and secured thereto, arms secured to said sleeve, a fixed pivot, a lever mounted thereon, links connecting said lever to at least a pair of said arms and adapted to transmit force from said arms to said fixed pivot, and a brake operating lever connected to one of said arms for rotating said sleeve, said sleeve being held from lateral displacement by said links.

12. In a vehicle, the combination of a cross shaft having a pair of oppositely extending arms at each end, pull rods for the front and rear brakes connected to said arms whereby said shaft delivers unbalanced couples through said pull rods at each of its ends, a coaxial sleeve engaging said shaft at a point equidistant from said arms and out of contact with the shaft, and means for delivering an unbalanced couple to said sleeve remote from said point.

13. In a vehicle, the combination of a cross shaft having outwardly extending arms at its ends, brake pull rods connected to said arms, and means for delivering an unbalanced couple to said shaft at a point spaced equally from said arms including a coaxial sleeve spaced from the shaft and secured thereto at said point.

14. In combination, a brake cross shaft, a sleeve overlying said shaft and secured thereto at the middle thereof and radially spaced from the shaft, arms secured to said sleeve, a fixed pivot, a lever mounted thereon, links connecting said lever to at least a pair of said arms and adapted to transmit force from said arms to said fixed pivot, and a brake operating lever connected to one of said arms for rotating said sleeve, said sleeve being held from lateral displacement by said links.

In testimony whereof, I hereunto affix my signature.

JOHN SNEED.